United States Patent [19]

Maiocchi

[11] 4,192,368

[45] Mar. 11, 1980

[54] TIRE CORE BEAD FOR TUBELESS TIRES

[75] Inventor: Luigi Maiocchi, Milan, Italy

[73] Assignee: Industrie Pirelli S.p.A., Milan, Italy

[21] Appl. No.: 857,446

[22] Filed: Dec. 5, 1977

[30] Foreign Application Priority Data

Dec. 13, 1976 [IT] Italy .............................. 30335 A/76

[51] Int. Cl.$^2$ .............................................. B60C 13/04
[52] U.S. Cl. .............................. 152/362 R; 152/379.1
[58] Field of Search ........................ 152/362 R, 379.1

[56] References Cited

U.S. PATENT DOCUMENTS 3,722,568  3/1973  Maiocchi ................... 152/362 CS X

FOREIGN PATENT DOCUMENTS

| 1418887 | 10/1965 | France | 152/362 R |
| 572270 | 6/1956 | Italy | 152/362 R |
| 2323051 | 5/1973 | Fed. Rep. of Germany | 152/362 R |
| 2458923 | 6/1975 | Fed. Rep. of Germany | 152/362 R |

*Primary Examiner*—Joseph F. Peters, Jr.
*Assistant Examiner*—D. W. Underwood
*Attorney, Agent, or Firm*—Stevens, Davis, Miller & Mosher

[57] ABSTRACT

A tubeless tire for a vehicle of the type adapted to be mounted on a one-piece undetachable rim of the drop-center type is provided. The tire is suitable for use with a rim having its bead-seats for the tire beads shaped like a truncated cone with the vertex axially turned towards the inside of the rim. The tire has beads having bead bases which are substantially frustum shaped for combining with the bead-seat of the rim. The angle of inclination of the beads is approximately the same as that of the bead seat. The tire beads are provided with reinforcing metallic wire cores which comprise a plurality of metallic turns closely wound together so as to constitute substantially a massive annular element that is circumferentially inextensible and has a cross-section of a polygonal shape. The core base is the radially innermost side of the polygon with respect to the tire. The element has an 'undercut' which is the side of the polygon that has one end in common with the axially internal end of the core base, the dihedral angle defined by the core base with the 'undercut' being between 90° and 160°. The polygon is an irregular polygon and the wire core is disposed in the bead of the tire with axially innermost extremity of the undercut passing through a plane perpendicular to the axis of rotation of the tire, passing through the axially innermost extremity of the bead-base.

4 Claims, 5 Drawing Figures

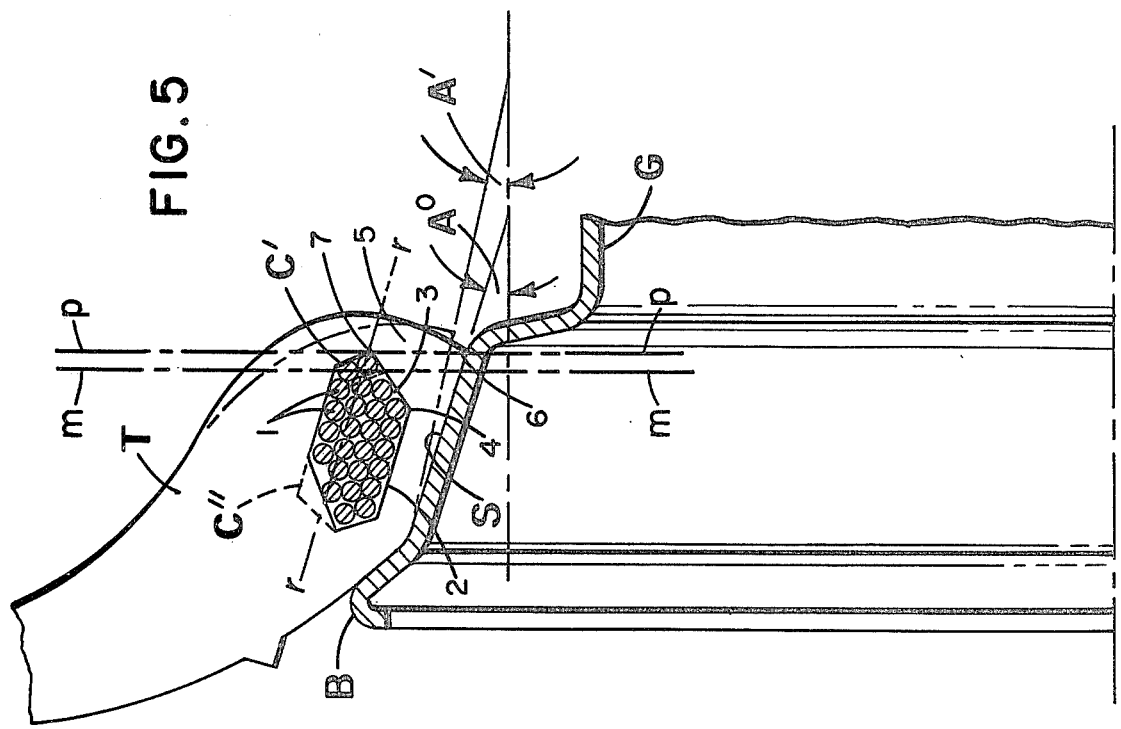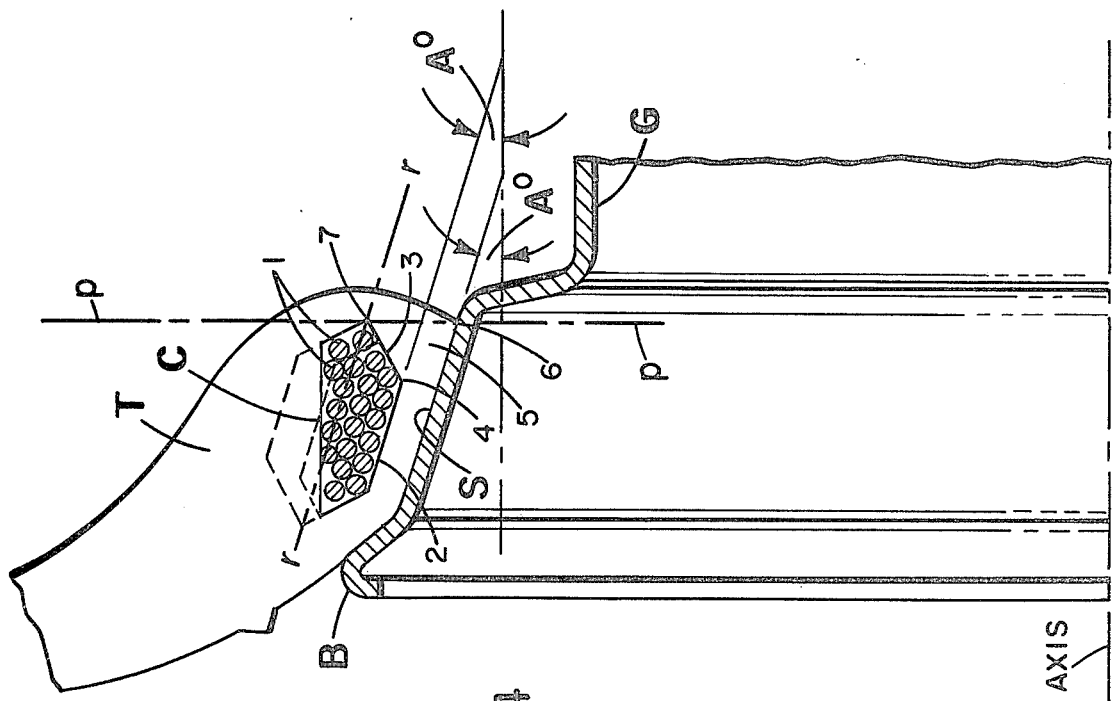

TIRE CORE BEAD FOR TUBELESS TIRES

The present invention relates generally to vehicle tires and, more particularly, to bead cores for reinforcing the bead of tubeless type vehicle tires, that is to say, tires not having an inner tube, which are fitted onto appropriate drop-center rims - i.e. onto one-piece, undetachable rims with inclined bead-seats, having the central throat or base-well and two rim side-flanges of a reduced height with respect to equivalent rims for tubed tires; and especially to tires for use on automotive transport - i.e. with giant tires.

Although such terms as bead, throat, base and rim flange, are well-known to a technician in the art, their meaning will however, become clearer from the table of FIG. 4 attached hereto, where, for the purpose of indication, they have been given the initials: T (bead), G (throat), S (seat), and B (rim flange), respectively.

As is already known, tubeless-tires are inflatable and can remain in this condition during tire exercise, since the rim base and the casing bead are airtight, whereas the rim itself, permits no other way of communication between the inside of the wheel and the outside ambient atmosphere - except through the inflating valve.

The airtightness is easily obtained by inclining the bead-seat of the rim and the complementary surface of the bead, which brings about a shrinkage between the two surfaces when the tire is inflated; whereas the necessity of having a one-piece rim, requires the fitting of the tire onto the rim, to be carried out by having the tire beads to mount over the above-said rim flange.

This operation is not easy to carry out, especially in the case of large-size or giant tires, having large beads and massive rims. It is carried out by inclining the diametrical plane of the carcass with respect to the rim, for allowing the beads to mount over the rim flanges, and it is actually the presence of the throat itself that allows the inclination of the diametrical plane to be maintained even after the first bead has already been fitted onto the rim.

In any case, this operation of surmounting the rim flange always requires a temporary deformation of the tire bead. This deformation is only possible to a certain extent, because the larger the carcass, the smaller will be its deformation capacity. Hence, it is absolutely necessary to keep the difference between the maximum diameter of the rim flange, and the minimum diameter of the casing bead, to within modest values.

The existence is mentioned hence, of a shrinkage between the carcass beads and the mounting rim - which for that matter, will appear quite obvious, on simply examining the above-mentioned attached figure.

The purpose of this shrinkage is not however limited to the airtightness, which can be also obtained by other means, but it is also directed towards obtaining a tight locking of the bead on the rim. Only under these conditions, as a matter of fact, can a tire guarantee a good road behavior when being utilized, and with a considerable service life for the bead - with consequently a long-lasting carcass, which are all, a result of these foreseen aspects.

The locking of the bead in the known carcasses, does not remain unaltered however, but progressively diminishes. In fact, successive to the said shrinkage, and the stresses borne during exercise, the bead end, i.e. the part of the bead that is in contact with the bead-seat on the rim, which is axially disposed on the tire inside with respect to the axially innermost extremity of the bead-core, becomes permanently deformed by rising in the radial direction with regard to the bead-seat. This causes the shrinkage surface of the bead to diminish, so that the locking force is diminished and greater forces are released on the remaining part of the bead underlying the wire-core, causing the deformation of the remaining part to be increased.

As a result, there is a progressive lessening of the inclination of the bead base, and consequently, a detaching of the bead surface from the bead seat, the detaching starting with the bead end and extending axially towards the outside in the direction of the rim flange.

As a result, the carcass bead becomes mobile on the rim. In fact, because it is not effectively suported by the rim flange, because of its reduced height, which is also an essential characteristic, and deprived of the greater part of its shrinkage, the bead acts as a hinge, and hence, rotates around a point that is more or less in correspondence with the rim flange.

These movements, as is well-known, cause the destruction of the bead in a short time also compromising the optimal qualities of tire behavior-right from their first manifestations.

In accordance with the present invention, a tubeless type tire is provided comprising a reinforcing bead wire core that keeps the configuration of the bead surface that is in contact with the corresponding rim seat non-deformable, and in particular, it maintains the inclination of the said surface unaltered, thus preventing the above-said deformations from becoming primed, but having the same characteristics of resistance to tensile stresses, and of weight and volume, as the usually known bead wire cores.

The present invention relates to a type of tire suitable for being fitted onto one-piece non-detachable rims of the so-called drop-center rim type, which has bead seats for the tire beads of the tubeless type of tire with a frusto-conical shape, with the vertex turned axially towards the inside of the rim, the beads having a substantially frusto-conical surface called bead-base, for combining with the bead-seat, the beads having approximately the same inclination as the latter, and being provided with a metallic reinforcement bead core, the bead core comprising a plurality of metallic turns, closely wound together for constituting a substantially massive annular element that is circumferentially inextensible, and having a cross-section, of a polygonal shape the radially innermost side of the polygon, with respect to the tire, being called core base; the polygon side having an extremity that is in common with the axially innermost extremity of the core base, being called the core 'undercut'; the dihedral angle delimited by the base with the 'undercut' being between 90° and 160°, the wire core being disposed in the bead of the tire with the axially innermost extremity of the undercut passing through a plane perpendicular to the axis of rotation of the tire, passing through the axially innermost extremity of the bead-base, the above-said polygon being moreover asymmetrical with respect to the straight-line parallel to the core base, and passing through the axially innermost extremity of the 'undercut'.

This latter condition can be obtained in diverse ways, giving rise to cores having cross-sections that are more or less visibly asymmetrical. In cases when determination is more difficult - i.e. when the polygon, of the actual cross-section of the core superimposing the polygon of the corresponding symmetrical section, shows shiftings of a minimum entity, the actual section is called 'asymmetrical' with reference to the present invention, when the ratio between the cross-section heights with respect to the core base, measured at the two extremities of the polygon side facing the base has a value outside the range of 0.8–1.25, or when the straight parallel of the base passing through the axially innermost extremity of the undercut divides at least one of the angles of the polygon having its vertex on a straight line, into two parts, which superimposed, are diverse from one another to a value that is equal at least to 10°, or eventually when the ratio between the projection of the 'undercut' on an orthogonal straight line at the core base and the cross-section height, with respect to the base, has a value equal to at least 0.6.

According to a preferred embodiment of the invention, the bead wire core has a hexagonal cross-section, responding to the last of the three cited conditions in which the hexagonal sides are parallel in pairs, to one another.

No matter what the form of the core cross-section may be, the core is preferably manufactured in such a way, that the core base has an inclination with respect to the core axis, that is substantially equal to the inclination of the bead-seat of the relative mounting rim. Moreover, the bead wire core is suitably assembled in the tire bead, in such a position that the axially innermost extremity of the 'undercut' lies substantially on the plane perpendicular to the tire axis and passing through the axially innermost extremity of the bead base.

The present invention will be better understood with the help of the following detailed description with reference to the accompanying drawings, given by way of a non-limiting example, and where:

FIG. 4 shows an axial cross-section of one of the two beads of a tubeless type of tire fitted onto its relative rim, and provided with a generic bead wire core, according to the invention, with an asymmetric pentagonal section placed facing with two corresponding known hexagonal cores, symmetrical and regular, in dotted-lines and broken lines respectively.

FIG. 5 shows, with the same characteristics of FIG. 4, a tubeless type tire bead, provided with a specific wire bead core, with hexagonal section, having two pairs of sides parallel to each other, according to the invention also placed facing with the corresponding core of the prior art, with a dotted-line and with the relative diverse configuration assumed by the bead with a broken-line.

FIGS. 1, 2 and 3 are self-evident, and hence do not require any detailed explanations; they serve for illustrating and justifying the assumption of certain critical values, specified before, as elements of separation between symmetrical and asymmetrical sections.

Figure 1:
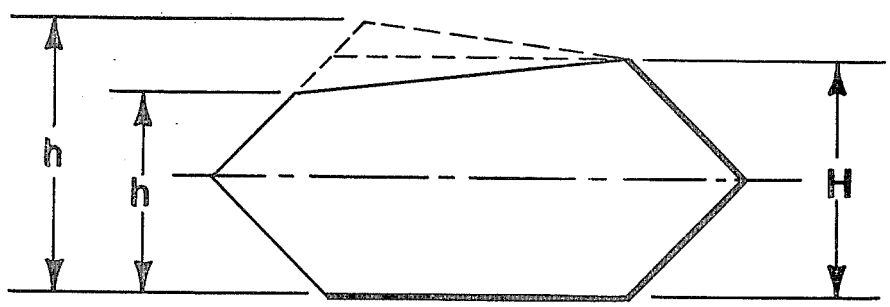
FIG. 1 shows an axial cross-section of two different asymmetrical bead wire cores which have hexagonal cross-sections, respectively defined by a full-line and a broken line, according to the first of the three above-conditions (H/h outside the range of 0.8–1.25) placed facing the corresponding symmetrical bead wire core, defined with a dotted line.
Figure 2:
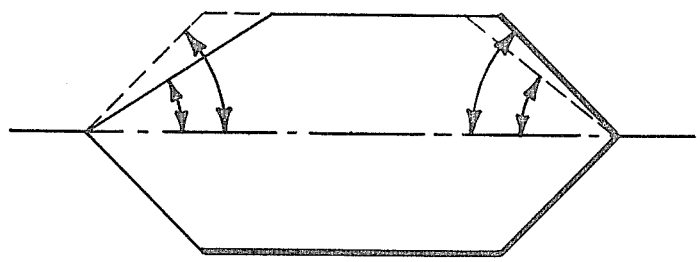
FIGS. 2 and 3 show, in axial cross-sctions, each one being a different example of an asymmetrical bead wire core with a hexagonal cross-section, defined by a full-line respectively, according to the other two above conditions, placed facing, with the corresponding symmetrical bead wire core defined by a dotted-line.
Figure 3:
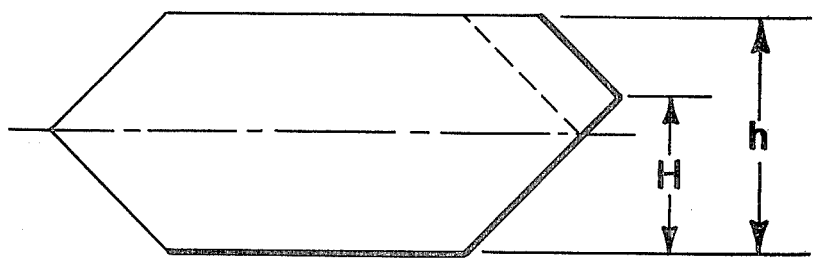

It must also be kept in mind that whereas most of the figures refer to beads with hexagonal sections, the said critical values are of a common character.

Referring to FIG. 4, the bead T of a tubeless type tire is fitted onto a drop-center rim having a throat G, a surface S for the bead seat, inclined at an angle of A° on the axis of the rim, and the rim flange B.

Usually, the inclination of A° of the seat S is 15°, while the inclination of the complementary tire surface, i.e. of the bead base is a little higher (an element which cannot be seen in the figure) for example 20°, so as to prime the inflating of the tire as soon as it is fitted onto the rim, and for contributing to the shrinkage of the bead, in particular, on the above-said bead end.

The bead thus comprises a bead wire core C comprising a plurality of metallic turns 1, closely wound together, around which are wrapped the carcass plies, according to the known plan, and method, which does not require any explanation.

This bead wire core becomes larger as the dimensions of the carcass increase. It must resist, in fact, not only the traction forces exercised by the carcass plies, but also resist the stresses caused by the shrinkage, owing to the inclined bases of the rim.

In any case, since these are known elements, it is relatively easy for a technician of the art to calculate the quantity of steel for the bead wire core, or rather the dimensions of the resistent section of the wire core, with which is also determined the area of the cross-section. The section is usually a regular symmetrical hexagon, like the one with the dotted-line in the figures. We shall henceforth, refer to as the 'core base', that sides of the polygon which is disposed radially innermost of the bead; and as 'core undercut', the sides having an extremity 4 in common with the axially innermost extremity of the base.

The 'undercut' usually has an inclination of 120° with respect to the base, however it can also have values around 120°, these being also acceptable. The practical results obtained, allow the applicant to fix the maximum width useful in this to around 70°, i.e. +40° and −30°, with respect to the value that is usually 120°. It is clear naturally that numerous sections can be given responding to the conditions required, each one defined by a different polygon, all presenting the same section area, i.e. the same resistent section.

After a series of experiments, the applicants have now arrived at the very surprising ascertation of the existence of a strict correlation between the service life of the bead and the aforesaid lessening of the inclination of the bead base, and also between this lessening and the form of the bead wire core or more exactly, the axial development of the same.

The position of the bead wire core in the bead, and in particular, the position of the bead wire core base with respect to the bead base, result as dependent upon the forces at play involved, and the characteristics of the elements which constitute the bead, as well as its geometrical form and the characteristics required for it. The applicants have now verified that each time, the polygon side that is internally adjacent to the bead wire core base, develops axially towards the inside of the tire until it gets into a substantially overlying position over the bead ends (FIG. 4), it does not any longer verify the variation in inclination of the bead base, with, at the same time, an appreciable increase in the service life of the beads and the quality of the behavior characteristics of the tire on duty.

Without in any way prejudicing or limiting the aim of this present invention, applicants believe that this benefit achieved, owing to the fact of the metallic bead wire core being axially developed thus, realizes a supporting and contrasting surface for the axially inner extremity of the bead base i.e. for the so-called 'bead end'. In other words, this part shows as being compressed, in particular, during exercise, between the two metallic facing surfaces; and hence, it works better than any corresponding bead end having the usual bead wire core.

In this case, as a matter of fact, the end that is not suitably supported radially from the outside with respect to the rim, is subjected to flexional stresses, and with the passage of time, it undergoes a permanent deformation that draws it away from the corresponding surface of the bead-seat.

This phenomena is put into evidence very well in FIG. 5, where the tire bead is illustrated with the special bead wire core C', according to the invention, with a hexagonal shape, with the base inclined at the same angle value of A° as the bead-seat. In the same figure there is shown (with the dotted-line) the position of the corresponding usual hexagonal bead wire core C of the prior art.

As can be easily verified, in this case the withdrawn position with respect to the bead end, of the axially internal shoulder of the bead wire core, deprives an annular bead zone between the planes m—m and p—p to the contrasting surface, with respect to the rim, and beginning with the bead end, said zone being, moreover, weakened still, owing to the reduction in the quantity of resistant material that is verified, and resulting from the effect of the different configuration assumed by the bead, because of the above-said withdrawn position.

The broken-line in FIG. 5 shows precisely this diverse configuration, as well as the final configuration, i.e. the lessening of the inclination (A') assumed with the passage of time by the bead base.

It is clear therefore, how the actual lack of the said contrasting surface and the small resistance to stress causes, in the long run, the radial deformations towards the outside of the bead end, exactly as said and illustrated.

On the other hand, this supporting effect of the bead end, cannot be obtained by simply shifting the known bead wire core C axially towards the inside until bringing its axially innermost extremity into correspondence with the above-said plane p—p before passing perpendicular to the tire axis and passing through the extremity 6 of the base tire bead, owing to the following reasons:

In the first place, it has already been explained how the position of the bead wire core, and particularly of the base of the said core, in the bead, results as predetermined, from the global characteristics that are desired for the bead. An appreciable shifting of the bead wire core from this pre-fixed position would derange the very structure and geometrical form of the bead, and, as a consequence, also the entire delicate equilibrium of the stresses that, alone, allow the tire to reach the required quality of performance.

In the second place, the bead end must be soft in order to become deformed when it surmounts the rim flange during the fitting-on of the tire as has, for that matter, already been explained.

Hence, it is necessary to have a considerable thickness or rubber in the zone that is axially inner to the bead. This thickness would be substantially reduced as the bead wire core advances, resulting in a consequent unacceptable hardening of the end, and a relative serious difficulty or impossibility even, of fitting the tire onto the rim, but causing, in any case a damage to the bead itself.

It is therefore quite clear that a suitable way for covering the bead end with the bead wire core, with respecting conditions consists in increasing the dimensions of the 'undercut' as much as needed, so that its axially inner extremity lies on the plane p—p, perpendicular to the axis of the bead wire core, and that passes through the extremity 6 of the bead base.

This dimensional variation of the 'undercut' brings about an easily understandable increase in the section area of the bead wire core, increasing quite visibly when maintaining the symmetry of the bead wire core is so desired (FIG. 4), more contained, or even null, in case a asymmetrical bead wire core is realized (FIG. 5).

In any case, even taken apart from the other more serious drawbacks, this increasing in the section area, is much less disadvantageous economically speaking.

From here, it is convenient to bring the area back substantially to the same value that was calculated, and considered sufficient for the pre-established aims of the know bead core used previously. This is quite easily obtainable by varying the section of the bead core rim (FIGS. 4 and 5,).

The new section of the bead core now shows as defined by a polygon that is different from the previous one, i.e in particular, asymmetrical with respect to the straight r parallel to the base of the bead core, and passing through the axially innermost extremity 7 of the 'undercut'.

In the attached FIGS. 4 and 5, the substantial equivalence is quite clearly given regarding the areas of the two corresponding bead wire cores.

It is to be understood that this present embodiment made by way of example, is not solely limited to that which is given above, but it also includes in its scope, any other alternative embodiments derived from this inventive principle, which are accessible to a technician of this art.

What is claimed is:

1. A vehicle tire of the type for being fitted onto a one-piece undetachable rim of the drop-center type and having its bead-seats for the tire beads shaped like a truncated cone with the vertex axially turned towards the inside of the rim, said beads having bead bases which are substantially a frustrum-shaped surface for combining with the said bead-seat, and having approximately the same angle of inclination as the latter, said beads being provided with a reinforcing metallic wire core, said wire core comprising a plurality of metallic turns closely wound together so as to constitute substantially a massive annular element that is circumferentially inextensible, and having a cross-section of a polygonal shape, the radially innermost side, with respect to the axis of rotation of the tire, of said polygon being the core base, the side of said polygon having one end in common with the axially internal end, with respect to the equatorial plane of the tire, of said core base being the undercut, the dihedral angle defined by the core base with the undercut being between 90° and 160°, said tire being charcterized in that it comprises said wire core disposed in the bead with the axially innermost extremity, with respect to the equatorial plane of the tire, of said undercut lying substantially on a plane perpendicular to the axis of rotation of the tire and passing through the axially innermost extremity of the bead base.

2. A vehicle tire as in claim 1 wherein said polygon is an irregular polygon, asymmetrical respecting the straight line parallel to the core base, and passing through the axially innermost extremity of said undercut.

3. A vehicle tire as in claim 2 wherein said polygon is a hexagon having its pair of sides parallel.

4. A vehicle tire as in claim 1 wherein said core base has, in the tire bead, an inclination that is substantially equal to that of said bead-set of the relative mounting rim.

* * * * *